United States Patent [19]

Hendricks et al.

[11] 4,326,987

[45] Apr. 27, 1982

[54] REACTION PRODUCTS OF ALKYL AND ALKENYL SUCCINIC ACIDS AND ETHER DIAMINES

[75] Inventors: Carl C. Hendricks, East Alton, Ill.; Richard L. Godar; Kenneth R. Roux, both of St. Louis, Mo.

[73] Assignee: Petrolite Corporation, St. Louis, Mo.

[21] Appl. No.: 124,031

[22] Filed: Feb. 25, 1980

[51] Int. Cl.$^3$ .......................... C23F 11/12; C23F 11/14
[52] U.S. Cl. .................................. 252/392; 106/14.15; 106/14.31; 106/14.37; 106/14.42; 252/51.5 R; 252/56 D; 252/394; 252/396; 422/7; 422/16
[58] Field of Search ................. 252/392, 396, 51.5 R, 252/56 D, 394; 106/14.15, 14.31, 14.37, 14.42; 208/47; 422/7, 16

[56] References Cited

U.S. PATENT DOCUMENTS

| | | | |
|---|---|---|---|
| 3,703,587 | 11/1972 | Spanos et al. | 252/392 |
| 4,047,899 | 9/1977 | Powell | 252/392 |
| 4,157,243 | 6/1979 | Ryer et al. | 252/392 |
| 4,253,876 | 3/1981 | Godar et al. | 252/392 |

*Primary Examiner*—Benjamin R. Padgett
*Assistant Examiner*—Irwin Gluck
*Attorney, Agent, or Firm*—Sidney B. Ring; Hyman F. Glass

[57] ABSTRACT

This invention relates to the reaction products of
(1) an alkenyl or alkyl succinic acid or the anhydride thereof; and
(2) an alkylether diamine; and to the use thereof as a corrosion inhibitor.

21 Claims, No Drawings

REACTION PRODUCTS OF ALKYL AND ALKENYL SUCCINIC ACIDS AND ETHER DIAMINES

In U.S. Pat. No. 3,703,587, there is described and claimed:

"1. The process of inhibiting corrosion of metals and alloys in contact with corrosive media which comprises contacting said metals and alloys with a poly-ester-amide-acid composition formed by reacting (1) an alkyl or an alkenyl succinic acid or the anhydride thereof with (2) a polyol, the product of which is reacted with an alkanol amine to form an ester-amide and then reacting said so formed ester-amide with an alkyl or an alkenyl succinic acid or the anhydride thereof."

The present invention relates to the reaction products of an alkyl or alkenyl succinic acid or the anhydride thereof (AASA) and an alkylether diamine (EDA) and the use thereof as corrosion inhibitors.

Alkenyl succinic acid anhydrides or the corresponding acids are utilizable in the present invention. The general structural formulae of these compounds are:

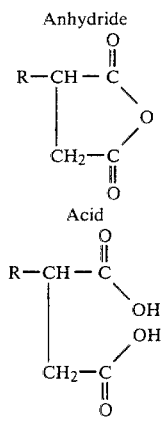

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. In order to produce the reaction products of this invention, however, an alkenyl succinic acid anhydride or the corresponding acid must be used. Succinic acid anhydride and succinic acid are not utilizable herein. For example, the reaction product produced by reacting with succinic acid anhydride is unsatisfactory. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride" is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methyl-butenyl succinic acid anhydride; 1,2-dichloropentyl succinic acid anhydride; hexenyl succinic acid anhydride; hexyl succinic acid; sulfurized 3-methylpentenyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-diodooctyl succinic acid; octenyl succinic acid anhydride; 2-methylheptenyl succinic acid anhydride; 4-ethylhexenyl succinic acid; 2-isopropylpentyl succinic acid anhydride; nonenyl succinic acid anhydride; 2-propylhexenyl succinic acid anhydride; decenyl succinic acid; decenyl succinic acid anhydride; 5-methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloro-undecyl succinic acid; 3-ethyl-2-t-butylpentenyl succinic acid anhydride; dodecenyl succinic acid anhydride; dodecenyl succinic acid; 2-propylnonenyl succinic acid anhydride; 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibromo-2-methylpentadecenyl succinic acid anhydride; 8-propylpentadecyl succinic acid anhydride; eicosenyl succinic acid anhydride; 1,2-dichloro-2-methylnona decenyl succinic acid anhydride; 2-octyldodecenyl succinic acid; 1,2-diiodotetracosenyl succinic acid anhydride; hexacosenyl succinic acid, hexacosenyl succinic acid anhydride; and hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relating pure anhydrides, are utilizable herein. Corresponding alkyl succinic anhydrides can also be employed, i.e., where the alkenyl group is saturated in any of the above instances, the preparation of alkyl succinic acids and anhydrides thereof is well known to the art.

The etherdiamine has the general formula ROANH A′NH$_2$ where R is an alkyl group having about 1 to 18 carbons, such as from about 5 to 13 carbons, for example from about 8 to 10 carbons, but preferably about 8–9 carbons.

A and A′, which may be the same or different alkylene group, having about 2 to 10 carbons such as about 2 to 5 carbons, but preferably 3 carbons.

The preferred etherdiamine is

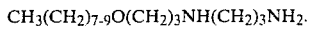

The reaction products are prepared by mixing the components together at ambient temperature. Since the reaction is exothermic, cooling may be desirable in larger batches.

The molecular weight of tetrapropenyl succinic acid is 284 and $CH_3(CH_2)_7CH_2O(CH_2)_3NH(CH_2)_3NH_2$ is 258. Thus, the stoichiometrical weight ratio of AASA to EDA is about 1.1 to 1. As a corrosion inhibitor the most effective AASA to EDA weight ratio is in excess of 1.1 to 1, with an optimum of about 3 to 1 or greater.

Thus, the AASA to EDA weight ratio can be for example from about 10 to 1, such as from about 8 to 1, but preferably from about 6 to 1, with an optimum of about 3 to 1.

Stated another way, the reaction product contains an excess of AASA.

The compositions of this invention which are soluble or dispersible therein are particularly useful as rust or corrosion inhibitors such as in refined petroleum products such as in gasoline, aviation, gasoline, jet fuels, turbine oils, fuel oils, etc.

They may be employed in any amount capable of inhibiting rust or corrosion, such as in minor amounts of at least 1 p.p.m., such as at least 5 p.p.m., for example 15 to 200 p.p.m., or more, but preferable 25–50 p.p.m. They are particularly effective in inhibition of rust and corrosion in refined petroleum products, such as petroleum distillates in contact with metals such as ferrous or other metal surfaces.

In certain instances, it may be desirable to add larger amounts of the compositions of the invention, such as up to about 100,000 p.p.m. or greater, for example from about 20 to 1,000 p.p.m. For example with lubricating oils about 500 to 1,000 p.p.m. or greater amounts are added. With heavy duty lube oil sometimes about 60,000 to 100,000 p.p.m. (i.e., about 6–10%) is sometimes added.

The following is a suitable test of evaluation for such compositions as rust inhibitors.

Procedure A for Distilled Water ASTM D665-60

Use clean equipment for the test as specified in the ASTM method D665-60. Pour 300 ml. of the oil to be tested into the beaker and place the beaker in the testing apparatus. Cover the beaker with the beaker cover with the stirrer in position in the proper opening. Adjust the stirrer so that the shaft is 6 mm. off center in the beaker containing the oil sample and the blade is within 2 mm. of the bottom of the beaker.

Insert the test specimen assembly through the specimen in the bottom of the beaker.

After the test specimen assembly has been suspended in the oil to be tested for 10 minutes of static wetting time, start the stirrer and continue to stir for twenty minutes to insure complete wetting of the steel specimen. With the stirrer in motion, add 30 ml. of distilled water through the thermometer hole, discharging the water on the bottom of the beaker. (The thermometer is omitted.) Continue stirring for 24 hours at a speed of 1000+ or −50 r.p.m. from the time the water was added. Stop stirring at the end of the 24-hour period, remove the specimen, wash with isopropyl alcohol, then ASTM precipitation naphtha or isooctane. The specimen is air dried and graded immediately. After grading the specimen may be preserved by coating with a clear lacquer or plastic.

Procedure B for Synthetic Sea Water

The procedure for rust-preventing characteristics of steam turbine oils in the presence of synthetic sea water shall be identical with that described earlier, except that synthetic sea water shall be used in place of distilled water in that portion of the procedure described earlier. The synthetic sea water shall have the following composition:

| Salt | g/liter |
|---|---|
| NaCl | 24.54 |
| $MgCl_2 \cdot 6H_2O$ | 11.10 |
| $Na_2SO_4$ | 4.09 |
| $CaCl_2$ | 1.16 |
| KCl | 0.69 |
| $NaHCO_3$ | 0.20 |
| KBr | 0.10 |
| $H_3BO_3$ | 0.03 |
| $SrCl_2 \cdot 6H_2O$ | 0.04 |
| NaF | 0.003 |

The solution can be conveniently prepared as follows. The method avoids any precipitation in concentrated solutions with subsequent uncertainty of complete resolution. Using CP chemicals and distilled water, prepared the following stock solutions:

| Stock Solution No. 1: | |
|---|---|
| $MgCl_2 \cdot 6H_2O$ | 3885 g |
| $CaCl_2$ (Anhydrous) | 406 g |
| $SrCl_2 \cdot 6H_2O$ | 14 g |
| Dissolve and dilute to 7 liters. | |

| Stock Solution No. 2: | |
|---|---|
| KCl | 483 g |
| $NaHCO_3$ | 140 g |
| KBr | 70 g |
| $H_3BO_3$ | 21 g |
| NaF | 2.1 g |
| Dissolve and dilute to 7 liters. | |

Report

Visual inspection of the exposed steel specimen shall be as specified in ASTM method D665-60.

The appearance of the specimens are rated according to the following tables:

| Appearance of Specimen | Rating | Designation |
|---|---|---|
| Free of rust | Passes | R1 |
| Trace of few spots (less than 6 sq. mm.) | " | R2 |
| Less than 5% surface rusted | Barely passes | R3 |
| 5 to 50% surface rusted | Does not pass | R4 |
| To 90% surface rusted | " | R5 |
| Surface covered with light rust | " | R6 |
| Surface covered with heavy rust | " | R7 |

The following examples are presented for purposes of illustration and not of limitation.

In the examples in the tables, the following compositions were compared:

A. Tetrapropenyl succinic acid
B. Ether diamine $CH_3(CH_2)_{7-9}O(CH_2)_3-NH-(CH_2)_3-NH_2$
AB. 3 parts A and 1 part B.

TABLE 1

| ASTM D665-60 Procedure A (Distilled Water) #2 fuel oil | | | |
|---|---|---|---|
| Ex. | Additive | conc, ppm | Rating |
| 1 | None | — | R-7 |
| 2 | AB | 1.7 | R-3 |

TABLE 1-continued

ASTM D665-60 Procedure A (Distilled Water) #2 fuel oil

| Ex. | Additive | conc, ppm | Rating |
|---|---|---|---|
| 3 | A B | 2.6 | R-1 |
| 8 | B | 3 | R-7 |
| 9 | B | 6 | R-4 |
| 10 | B | 9 | R-4 |

TABLE 2

ASTM D665-60 Procedure B (Sea Water) #2 fuel oil

| Ex. | Additive | conc, ppm | Rating |
|---|---|---|---|
| 1 | None | — | R-7 |
| 2 | A + B | 6.6 + 2.1 | R-4 |
| 3 | A + B | 9.8 + 3.2 | R-3 |
| 4 | A + B | 13.1 + 4.3 | R-1 |
| 5 | B | 10 | R-7 |
| 6 | B | 30 | R-3 |
| 7 | B | 40 | R-3 |
| 8 | A | 5 | R-4 |
| 9 | A | 10 | R-3 |
| 10 | A | 15 | R-3 |

TABLE 3

Lubricating Base Oil

| Ex. | Additive | conc, ppm | Rating |
|---|---|---|---|
| 1 | None | — | R-7 |
| 2 | A + B | 10 + 100 | R-7 |
| 3 | A + B | 20 + 80 | R-7 |
| 4 | A + B | 30 + 60 | R-7 |
| 5 | A + B | 40 + 40 | R-3 |
| 6 | A + B | 50 + 20 | R-3 |
| 7 | A | 60 | R-4 |

The above table illustrates that where the stoichiometric ratio of ASAA to EDA is low, corrosion inhibition is less effective.

Static Rust Test

1. Put 2000 ml furnace oil without additives into 1 gal. jug.
2. Add X ml additive (1% solutions).
3. Shake 15 seconds.
4. Add 20 ml of 0.25% NaCl solution.
5. Shake 30 seconds.
6. Put special Millipore filter cap on jug and invert for 5 min.
7. Put metal coupons into small cannisters (1½ oz. seamless tin boxes).
8. Drain off water phase and some fuel (¼ inch) phase over coupon.
9. Important: Do not use acetone to clean special caps. Rinse over vacuum with IPA, followed by hexane.
10. Pass = No rust after 24 hours.

Note: Degrease metal coupons with benzene then store in acetone.

TABLE 4

STATIC RUST TEST #2 fuel oil

| Ex. | Additive | conc, ppm | Rating |
|---|---|---|---|
| 1 | None | — | Fail |
| 2 | $R^1$—O—$(CH_2)_3$—NH—$(CH_2)_3$—$NH_2$ | 30 | Fail |
| 3 | $R^2$—O—$(CH_2)_3$—NH—$(CH_2)_3$—$NH_2$ | 30 | Fail |
| 4 | B | 30 | Pass |
| 5 | B | 20 | Pass |
| 6 | B | 15 | Pass |
| 7 | A | 15 | Fail |
| 8 | A + B | 6.6 + 2.1 | Pass |
| 9 | A + B | 9.8 + 3.2 | Pass |
| 10 | A + B | 13.1 + 4.3 | Pass | where:
Pass = 0 rust
$R^1 = CH_3(CH_2)_9$
$R^2 = CH_3(CH_2)_{13}$

We claim:

1. A composition comprising the reaction product of
   (1) an alkenyl or alkyl succinic acid or the anhydride thereof; and
   (2) an alkyl etherdiamine.
2. The composition of claim 1 where the alkylether diamine has the formula ROANHA'NH$_2$ where R is alkyl and A and A' are alkylene.
3. The composition of claim 2 where the alkylether diamine is $CH_3(CH_2)_nO(CH_2)_3NH(CH_2)_3NH_2$ where n=7–13.
4. The composition of claim 1 where a stoichiometric excess of alkenyl or alkyl succinic acid or anhydride thereof is reacted.
5. The composition of claim 2 where a stoichiometric excess of alkenyl or alkyl succinic acid or anhydride thereof is reacted.
6. The composition of claim 3 where a stoichiometric excess of alkenyl or alkyl succinic acid or anhydride thereof is reacted.
7. The composition of claim 1 where the alkenyl group is tetrapropenyl.
8. The composition of claim 2 where the alkenyl group is tetrapropenyl.
9. The composition of claim 3 where the alkenyl group is tetrapropenyl.
10. The composition of claim 4 where the alkenyl group is tetrapropenyl.
11. The composition of claim 5 where the alkenyl group is tetrapropenyl.
12. The composition of claim 6 where the alkenyl group is tetrapropenyl.
13. A process of inhibiting corrosion which comprises treating a system with the composition of claim 4.
14. A process of inhibiting corrosion which comprises treating a system with the composition of claim 5.
15. A process of inhibiting corrosion which comprises treating a system with the composition of claim 6.
16. A process of inhibiting corrosion which comprises treating a system with the composition of claim 7.
17. A process of inhibiting corrosion which comprises treating a system with the composition of claim 8.
18. A process of inhibiting corrosion which comprises treating a system with the composition of claim 9.
19. A process of inhibiting corrosion which comprises treating a system with the composition of claim 10.
20. A process of inhibiting corrosion which comprises treating a system with the composition of claim 11.
21. A process of inhibiting corrosion which comprises treating a system with the composition of claim 12.

* * * * *